(12) United States Patent
Saves-Saint-Germes (10) Patent No.: US 7,421,906 B2
(45) Date of Patent: *Sep. 9, 2008

(54) APPARATUS FOR TESTING A FUSELAGE STRUCTURE HAVING A LONGITUDINAL AND CIRCUMFERENTIAL CURVATURE

(75) Inventor: Cyrille Saves-Saint-Germes, Seysses (FR)

(73) Assignee: Airbus France, Toulouse (FR)

( * ) Notice: Subject to any disclaimer, the term of this patent is extended or adjusted under 35 U.S.C. 154(b) by 127 days.

This patent is subject to a terminal disclaimer.

(21) Appl. No.: 11/492,818

(22) Filed: Jul. 26, 2006

(65) Prior Publication Data

US 2007/0068275 A1  Mar. 29, 2007

Related U.S. Application Data

(60) Provisional application No. 60/714,366, filed on Sep. 7, 2005.

(30) Foreign Application Priority Data

Jul. 26, 2005  (FR) .................................. 05 07955

(51) Int. Cl.
  *G01M 5/00* (2006.01)
(52) U.S. Cl. .............................. 73/802; 73/818; 73/841
(58) Field of Classification Search .................. 73/802, 73/818, 841
  See application file for complete search history.

(56) References Cited

U.S. PATENT DOCUMENTS

| | | | | |
|---|---|---|---|---|
| 2,151,584 A | * | 3/1939 | Bugatti ......................... | 73/796 |
| 2,383,491 A | * | 8/1945 | Kemmer et al. ............... | 73/798 |
| 2,425,273 A | * | 8/1947 | Watter ......................... | 73/802 |
| 5,065,630 A | * | 11/1991 | Hadcock et al. ............... | 73/802 |
| 5,113,079 A | * | 5/1992 | Matulka ....................... | 250/550 |
| 5,379,645 A | * | 1/1995 | Smart .......................... | 73/794 |
| 5,425,276 A | * | 6/1995 | Gram et al. ................... | 73/816 |
| 5,712,431 A | * | 1/1998 | Vilendrer ...................... | 73/841 |

(Continued)

FOREIGN PATENT DOCUMENTS

DE  727 247  10/1942

(Continued)

OTHER PUBLICATIONS

Hans-Jürgen Schmidt, et al., "Tango Metallic Fuselage Barrel Validation of Advanced Technologies", ICAF 2001, Design for Durability in the Digital Age, vol. 1, 1 front page, pp. 272-289, Jun. 27-29, 2001.

(Continued)

*Primary Examiner*—Edward Lefkowitz
*Assistant Examiner*—Freddie Kirkland, III
(74) *Attorney, Agent, or Firm*—Oblon, Spivak, McClelland, Maier & Neustadt, P.C.

(57) ABSTRACT

The apparatus for testing a fuselage structure having longitudinal and circumferential curvature includes an assembly for applying forces to the fuselage structure. It includes a support capable of supporting the fuselage structure and the assembly for applying forces. The assembly for applying forces is mounted between the support and a force-introduction mechanism interlocked with the fuselage structure, and is capable of applying collinear forces to the fuselage structure. The apparatus can be used to perform tests on an airplane fuselage.

17 Claims, 10 Drawing Sheets

U.S. PATENT DOCUMENTS

| | | | |
|---|---|---|---|
| 6,035,715 A | | 3/2000 | Porter |
| 6,298,729 B1 * | | 10/2001 | Locker et al. ................ 73/668 |
| 6,598,486 B2 * | | 7/2003 | Vilendrer et al. ............ 73/841 |
| 7,155,982 B2 * | | 1/2007 | Oesmann et al. ............. 73/841 |
| 2002/0170361 A1 * | | 11/2002 | Vilendrer et al. ............ 73/849 |
| 2005/0109118 A1 * | | 5/2005 | Oesmann et al. ............. 73/841 |
| 2007/0022821 A1 * | | 2/2007 | Saves-Saint-Germes ..... 73/802 |

FOREIGN PATENT DOCUMENTS

| | | |
|---|---|---|
| DE | 92 01 231 U1 | 1/1993 |
| DE | 297 11 362 U1 | 2/1998 |
| DE | 197 21 845 A1 | 12/1998 |
| WO | WO 02/103326 A1 | 12/2002 |

OTHER PUBLICATIONS

Marc Langon, et al., "Development of a Test Fixture for Fuselage Curved Panels", ICAF 1999, Structural Integrity for the Next Millennium, pp. 745-753.

Dr. John G. Bakuckas, Jr., et al., "Full-Scale Testing of Fuselage Panels", Proceedings of Autotestcon 2001, Aug. 20-23, 2001, pp. 1-20.

* cited by examiner

APPARATUS FOR TESTING A FUSELAGE STRUCTURE HAVING A LONGITUDINAL AND CIRCUMFERENTIAL CURVATURE

BACKGROUND OF THE INVENTION

1. Field of the Invention

The present invention relates to a testing apparatus associated with a fuselage structure having double curvature.

2. Discussion of the Background

More particularly, the present invention is aimed at providing a testing apparatus that permits testing the static strength, fatigue strength and tolerance to damage of fuselage structures having double curvature, or in other words longitudinal and circumferential curvature.

In practice, these fuselage structures are fuselage rings typically used to construct the aft or fore fuselage of an airplane.

It is known that such a testing apparatus can be used to apply to the fuselage structure, by means of a force-application system, stresses representative of the stresses undergone by the fuselage structure during its use. These stresses are typically tensile or compressive forces exerted in the longitudinal direction of the structure, torsional forces around the circumference of the structure and pressure forces related to the pressure difference existing between the interior and exterior of the aircraft.

For example, there is known a testing apparatus making it possible to apply pressure forces and an axial mechanical load to a structure having simple curvature, of the same type as a cylindrical ring, as described in the document "Development of a test fixture for fuselage curved panels", by M. Langon and C. Meyer, CEAT, ICAF 1999, pages 745 to 753.

Nevertheless, such a testing apparatus cannot be applied to a fuselage structure having double curvature and still be representative of the real stresses experienced by the airplane's fuselage structure.

SUMMARY OF THE INVENTION

The objective of the present invention is to resolve the aforesaid disadvantages and to provide an apparatus for testing a fuselage structure having double curvature.

To this end, the testing apparatus associated with a fuselage structure having longitudinal and circumferential curvature comprises an assembly of means for applying forces to the fuselage structure.

According to the invention, it comprises support means capable of supporting the said fuselage structure and the assembly of force-application means, this assembly of force-application means being mounted between the support means and the force-introduction means interlocked with the said fuselage structure, and being capable of applying collinear forces to the fuselage structure.

By applying forces in collinear manner to the fuselage structure in this way, which forces therefore remain tangential to the structure having double curvature at their point of application, it is possible to apply representative airplane stresses undergone by the fuselage structure during its use.

In practice, the force-introduction means are formed by a substantially circular structure interlocked with the fuselage structure along a circumferential line.

By applying forces via a substantially circular structure, it is possible to apply stresses that are uniformly distributed over the circumference of the fuselage structure.

According to one characteristic of the invention, the force-introduction means are fixed to an upper end of the fuselage structure.

In this way, the entire fuselage structure, and not merely one portion, is subjected to the applied forces.

Preferably the upper end is an end of larger diameter of the fuselage structure.

Thus local variations at the force-application point are not very significant compared with the entirety of the fuselage structure.

According to another advantageous characteristic of the invention, the force-introduction means comprise pinch-type fixation means capable of interlocking the force-introduction means with the upper end of the fuselage structure in tension and in torsion.

Pinch-type fixation of the upper end of the fuselage structure makes it possible to avoid any fixation element that could damage the fuselage structure.

In addition, mounting and demounting of the structure in these fixation means are facilitated, especially during actions for inspection of the fuselage structure after it has been stressed.

In practice, the means for applying forces of a first type are capable of applying a tensile or compressive force to the fuselage structure, and the means for applying forces of a second type are capable of applying a torsional force to the fuselage structure.

BRIEF DESCRIPTION OF THE DRAWINGS

Other features and advantages of the invention will become more apparent in the description hereinafter.

In the attached drawings, provided by way of non-limitative examples.

DETAILED DESCRIPTION OF THE PREFERRED EMBODIMENTS

Referring now to the figures, there will be described a practical example of an apparatus for testing a fuselage structure.

Figure 1:
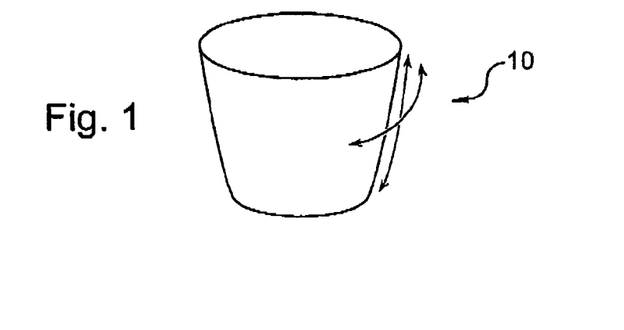
FIG. 1 is a schematic perspective view of a fuselage structure having double curvature.

The testing apparatus to be described hereinafter makes it possible to test a structure 10 having double curvature as illustrated in FIG. 1.

For example, it may be a fuselage ring having both longitudinal curvature and circumferential curvature, as illustrated by the arrows in FIG. 1.

The testing apparatus makes it possible to test the static strength, fatigue strength and damage tolerance of such a structure.

In general, it makes it possible to apply stresses representative of those experienced by an airplane structure, and especially tensile or compressive forces in the longitudinal direction, torsional forces relative to the longitudinal axis or even pressure forces due to the pressure difference between the interior of the structure and the outside.

It will be understood that it is necessary to be able to combine all of these types of forces to be exerted on the structure.

At present, the behavior of a fuselage structure having double curvature is learned by means of tests and numerical simulations on structures having single curvature.

Test data are therefore necessary to validate and calibrate the numerical models used for the configurations having double curvature, in order to learn the behavior thereof.

The testing apparatus such as described hereinafter also makes it possible to evaluate and study the behavior of new materials (metallic and composites) as well as to study new technologies.

Figure 2:
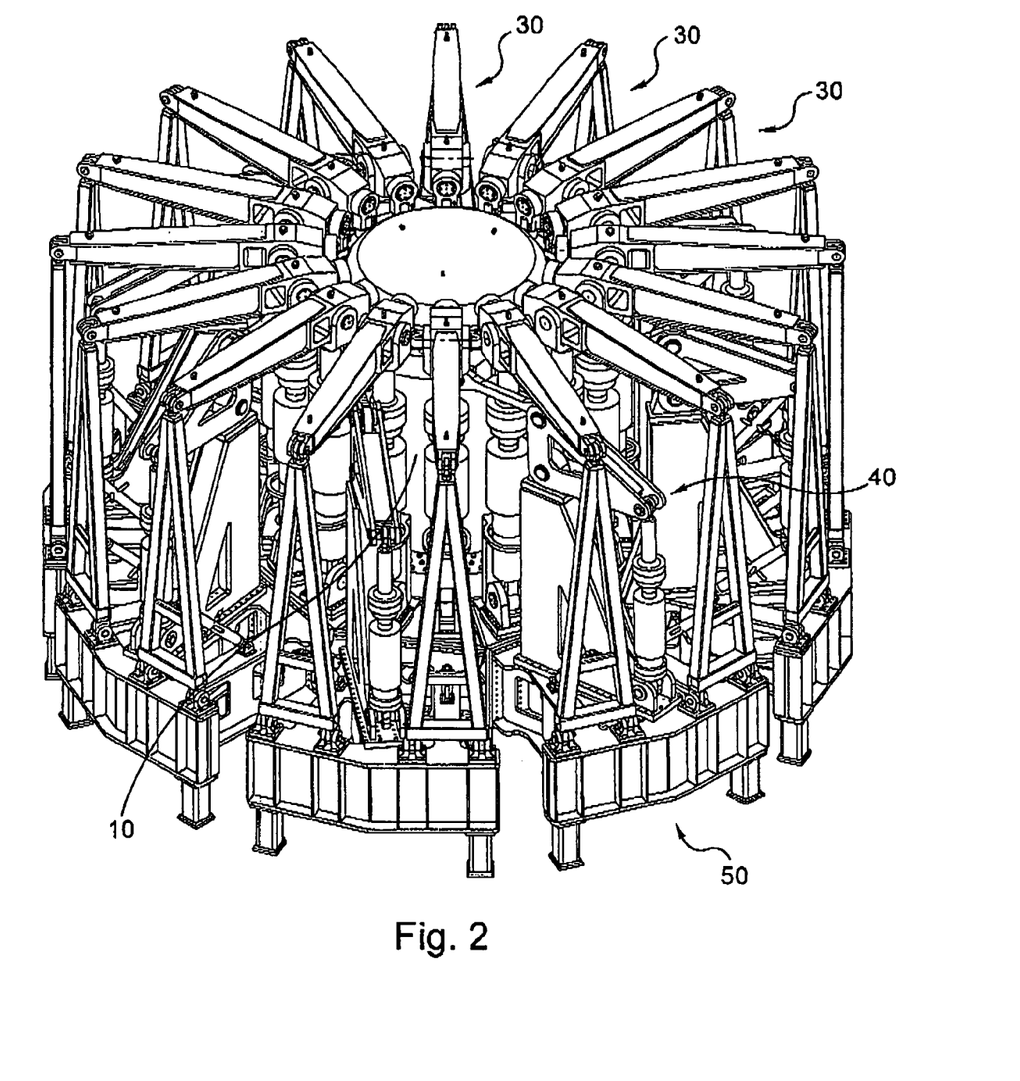
FIG. 2 illustrates, in perspective, a testing apparatus according to one embodiment of the invention.
Figure 3:
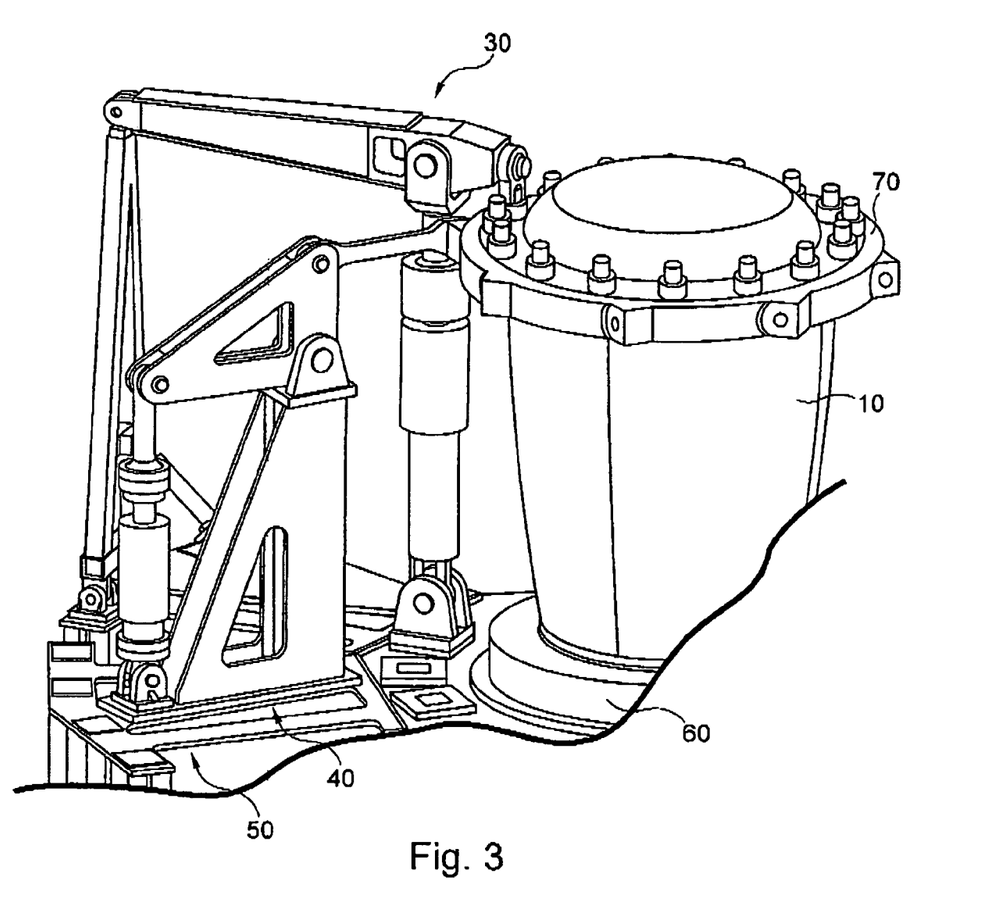
FIG. 3 is a simplified partial view in elevation illustrating the principle of the testing apparatus of FIG. 2.

A testing apparatus according to one embodiment of the invention is illustrated in general manner in FIGS. 2 and 3.

In principle, the testing apparatus includes force-application means 30, 40 mounted around fuselage structure 10 on support means 50.

As clearly illustrated schematically in FIG. 3, fuselage structure 10 is mounted at the center of support means 50 by virtue of fixation means 60. Force-application means 30, 40 are mounted at the periphery between support means 50 and force-introduction means 70 fixed to fuselage structure 10.

In this embodiment, force-application means 30 are capable of applying a force of a first type, corresponding to a longitudinal tensile or compressive force, applied in the longitudinal direction of the fuselage structure.

Force application means 40 are means for applying forces of a second type, and are capable of applying a torsional force to fuselage structure 10, in the circumferential direction of fuselage structure 10.

In practice, to ensure that stresses on the fuselage structure will be uniformly distributed, these force-application means 30, 40 are composed of a plurality of force-application structures disposed regularly at the periphery of the fuselage structure.

As an example, the means for applying longitudinal forces in this embodiment include sixteen identical structures 30 for application of longitudinal forces.

Figure 4:
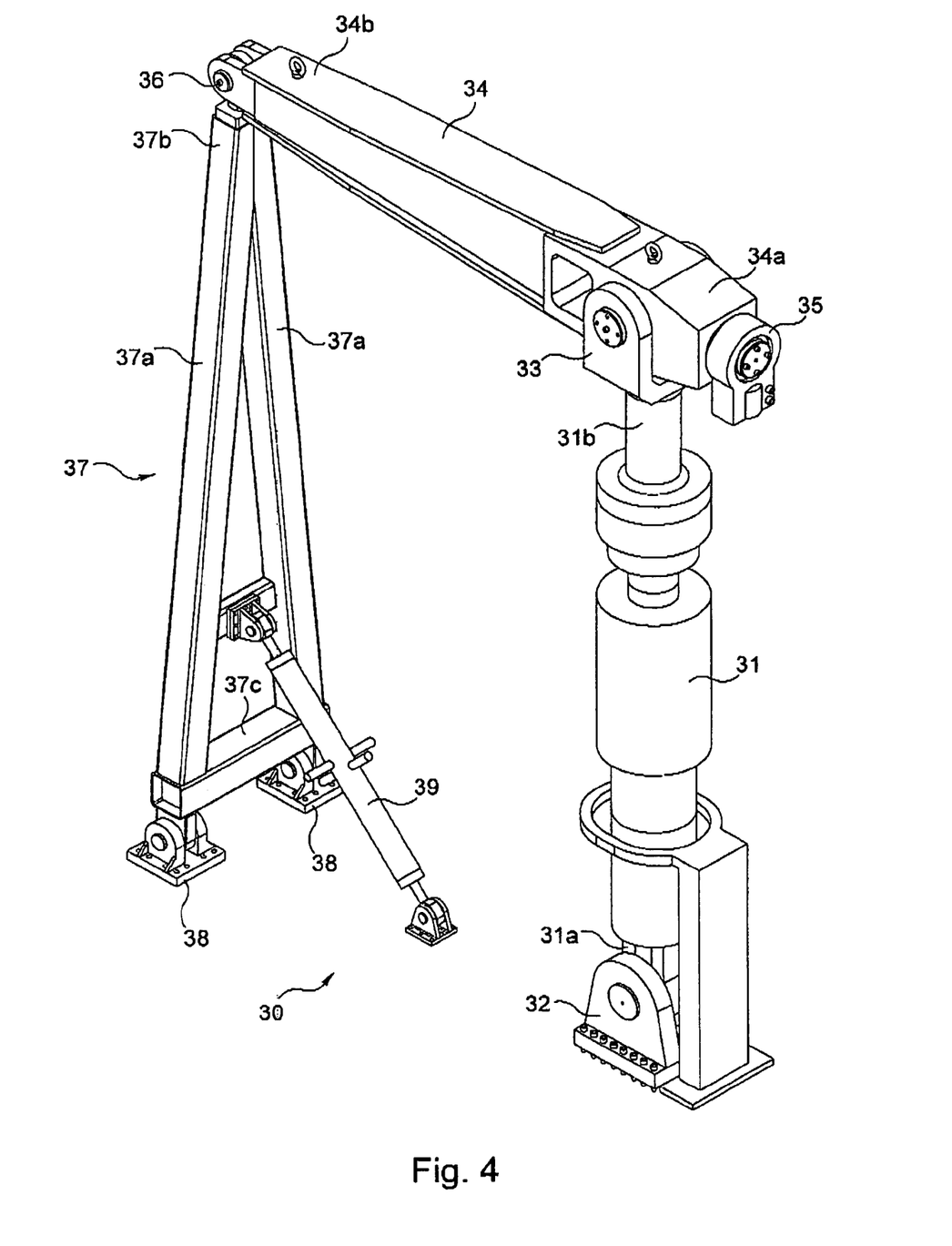
FIG. 4 is a perspective view of a means for applying forces of a first type in the testing apparatus of FIG. 2.

One of those is illustrated in detail in FIG. 4.

It comprises a hydraulic jack 31 mounted substantially vertically and capable of exerting a compressive or tensile force along the axis of the rod of the jack. By means of a pivot joint, this hydraulic jack 31 is mounted around a horizontal axis at its ends 31a, 31b.

In particular, at lower end 31a, hydraulic jack 31 is mounted pivotally in an eye joint link 32 intended to be fixed to support means 50.

Hydraulic jack 31 includes an actuating end 31b, corresponding in this case to the upper end of hydraulic jack 31. This actuating end 31b is fixed by means of an eye joint link 33 to a first end 34a of a lever arm 34.

First end 34a includes fixation means 35 intended to fix lever arm 34 to force-introduction means 70. A second end 34b of lever arm 34 is fixed, also by means of a pivot joint 36, to a pylon 37, intended to be mounted on support means 50.

Mounting of pylon 37 on fixation devices 38 is achieved again by means of pivot joints of the same type as eye joint links 32 and 33. Preferably, in order to make pylon 37 rigid, it is composed of two legs 37a inclined relative to the vertical axis and joined at end 37b, which is fixed to second end 34b of lever arm 34 via pivot joint 36.

Legs 37a of pylon 37 are fixed respectively by fixation devices 38 to support means 50, a crossbeam 37c extending between legs 37 in order to increase the rigidity of the structure of pylon 37.

This special structure of pylon 37 is particularly capable of absorbing the stresses exerted by jack 31 on the fuselage structure by means of lever arm 34.

As described hereinabove, jack 31, lever arm 34 and pylon 37 are fixed to one another and to support means 50 by virtue of joints pivoting respectively around mutually parallel horizontal axes.

The said jack, lever arm and pylon therefore constitute a deformable quadrilateral in particular making it possible, by inclining jack 31 around fixation eye joint link 32, to move jack 31, lever arm 34 and pylon 37 aside from fuselage structure 10 to facilitate access thereto, especially to inspect the structure after application of a set of stresses or to permit fuselage structure 10 to be placed on support means 50.

It will be noted that all of the fixations to support means 50 are achieved by virtue of nut-and-bolt assemblies of sufficient dimension and size that they can withstand the longitudinal stresses applied to the fuselage structure.

Furthermore, this structure 30 for application of longitudinal forces is supplemented by an auxiliary arm 39 extending between pylon 37 and support means 50.

This auxiliary arm 39 makes it possible to hold together the deformable assembly comprising jack 31, lever arm 34 and pylon 37 when lever arm 34 is detached from force-introduction means 70, and to ensure that the deformable quadrilateral does not become completely inclined to the horizontal.

By virtue of the mounting of jack 31 in eye joint links 32, 33, the direction of operation of the rod of hydraulic jack 31 can follow the longitudinal deformation of the fuselage structure, in such a way that the force exerted remains collinear with fuselage structure 10, or in other words that the force applied is at all times tangential to its point of application on the longitudinally curved surface of the fuselage structure.

Figure 5:
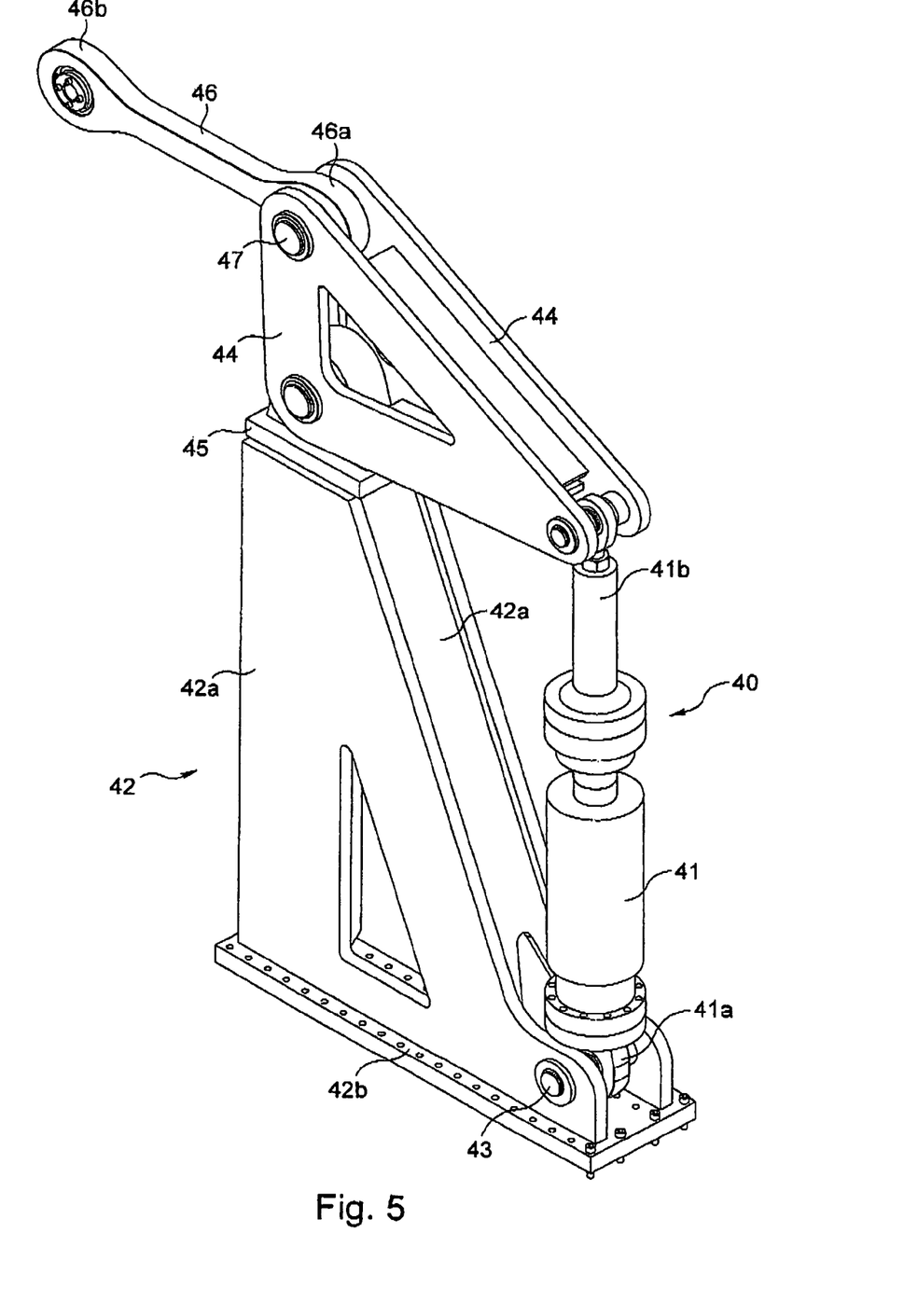
FIG. 5 is a perspective view of a means for applying forces of a second type in the testing apparatus of FIG. 2.

Referring now to FIG. 5, there will be described the means 40 for application of forces of a second type capable of applying a torsional force to the fuselage structure.

These means for applying forces of a second type include eight identical force-application structures, one of which is illustrated in detail in FIG. 5.

Means 40 for application of forces of a second type include a hydraulic jack 41 mounted on a support structure 42. This support structure 42 is composed in this embodiment of two triangular plates 42a disposed parallel to one another and fixed to a support plate 42b intended to be fixed to support means 50.

Hydraulic jack 41 has a lower end 41a mounted via pivot joint 43 between plates 42a of support structure 42.

A lever arm 44 forming a coupler link is also fixed on the one hand to an actuating end 41b of hydraulic jack 41 and on the other hand to a support bearing 45 interlocked with support structure 42.

The fixations of actuating end 41b and support bearing 45 to lever arm 44 forming a coupler link are pivot joints that permit pivoting of lever arm 44 forming a coupler link around support bearing 45 during translational movement of the rod of jack 41.

This pivoting action is transmitted to an auxiliary lever arm 46, which is also mounted pivotally, at one of its ends 46a, around a pivot axis 47 on lever arm 44 forming a coupler link.

Free end 46b of the auxiliary lever arm is equipped with a spherical plain bearing and is capable of being fixed to force-introduction means 70. By virtue of this spherical plain bearing having three rotational degrees of freedom, the force applied by auxiliary lever arm 46 under the action of hydraulic jack 41 is a force tangential to the circumferentially curved surface of fuselage structure 10, even after deformation thereof in its longitudinal or circumferential directions.

Figure 6:
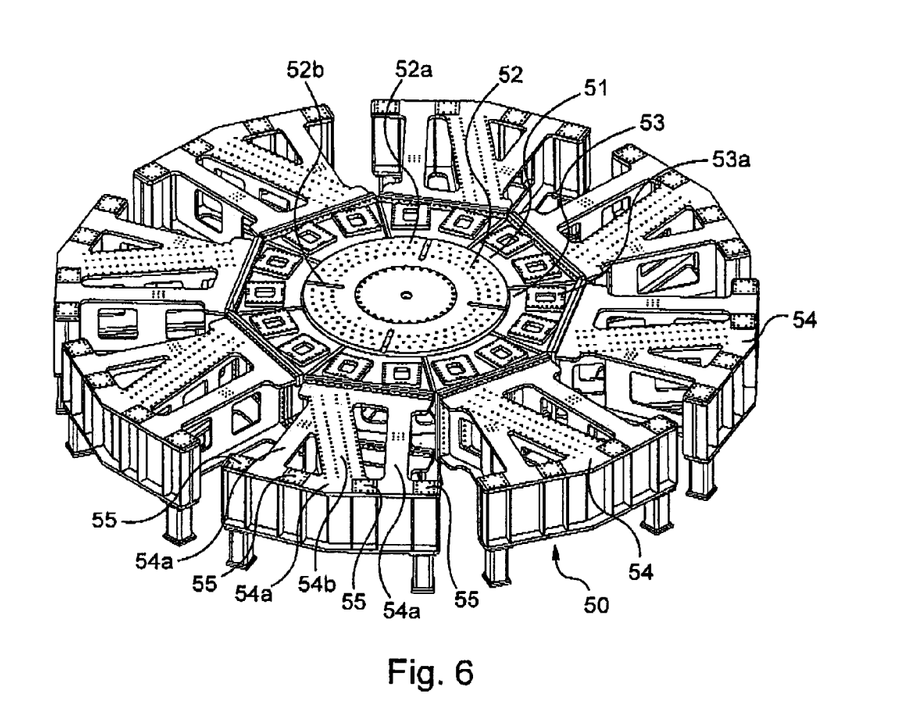
FIG. 6 is a perspective view of support means of the testing apparatus of FIG. 2.
Figure 7:
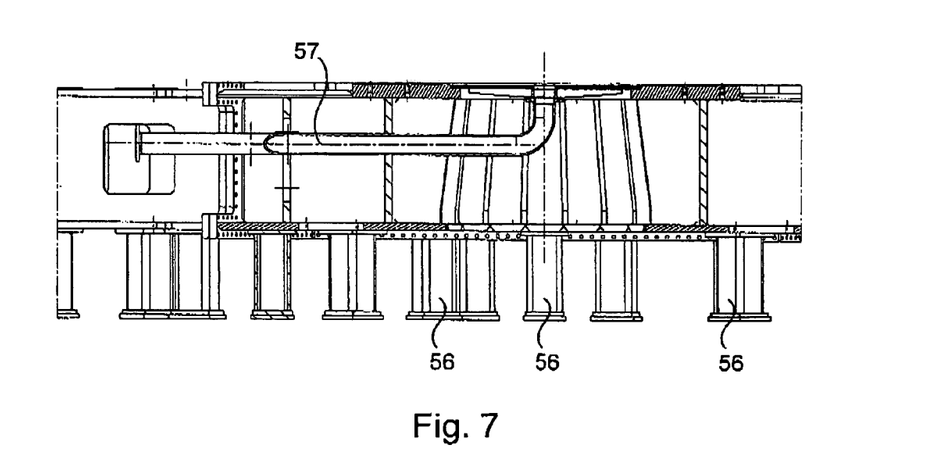
FIG. 7 is a view in partial cross section of the support means of FIG. 6.

Referring now to FIGS. 6 and 7, there will be described support means 50.

As illustrated in FIG. 6, support means 50 includes a central platform 51 designed to support fuselage structure 10. In this regard, the platform has at its center a disk 52, on which the fuselage structure is fixed by fixation means to be described later.

In addition, platform 51 includes extensions 53 beyond disk 52, capable of supporting force-application means. In the present case, there are eight such extensions 53. Platform 51 therefore has overall octagonal shape, each extension 53 forming one side of the octagon.

In this embodiment, in which the means for applying tensile/compressive forces include sixteen hydraulic jacks, each extension 53 includes two fixation supports 53a on which there can be fixed respectively two hydraulic jacks 31 for application of a tensile/compressive fixation force 32, by means of a fixation eye joint link 32.

Support means 50 additionally include a peripheral structure composed of extensions 54 extending radially relative to central platform 51.

More particularly, this peripheral structure in the present case includes eight adjacent extensions 54, fixed respectively to the eight sides of central platform 51.

Each extension 54 is composed of profile sections, and in particular includes two radially extending profile sections 54a and one profile section 54b substantially inclined relative to radial profile sections 54a.

Inclined profile section 54b is capable of supporting means 40 for application of torsional forces.

To this end, each profile section 54b has a series of bores permitting a support plate 42b of a structure 40 for application of torsional forces to be fixed by nuts and bolts.

In addition, each extension 54 is provided at the periphery with pads 55 intended to receive fixation devices 38 of pylons 37 of means 30 for application of tensile or compressive forces.

In this way support means 50 make it possible to absorb all loads applied to fuselage structure 10 mounted at its center.

These support means 50 therefore have overall circular shape suitable for mounting, on the periphery of fuselage structure 10, different means 30, 40 for application of forces.

As clearly illustrated in FIGS. 6 or 7, support means 50 include a series of pillars 56 with which the structure can be embedded in the floor.

As clearly illustrated in FIG. 7, support means 50 house a conduit 57 through which there can be supplied a pressurized fluid to means of pressurizing the interior of fuselage structure 10, which means will be described later with reference to FIGS. 15 and 16.

Fixation of fuselage structure 10 on support means 50 is achieved by pinching (or clamping), making it possible to keep fuselage structure 50 pinched between an inner ring and an outer ring, merely by exerting a clamping force, the fuselage structure being held by friction. This type of fixation has the advantage that it does not damage fuselage structure 10 during the tests.

Fuselage structure 10 is fixed at its small diameter by fixation means 60 on support means 50.

Fixation means 60 include essentially an outer ring 61, a contour ring 62, a pinch ring 63 and an inner ring 64.

Figure 8:
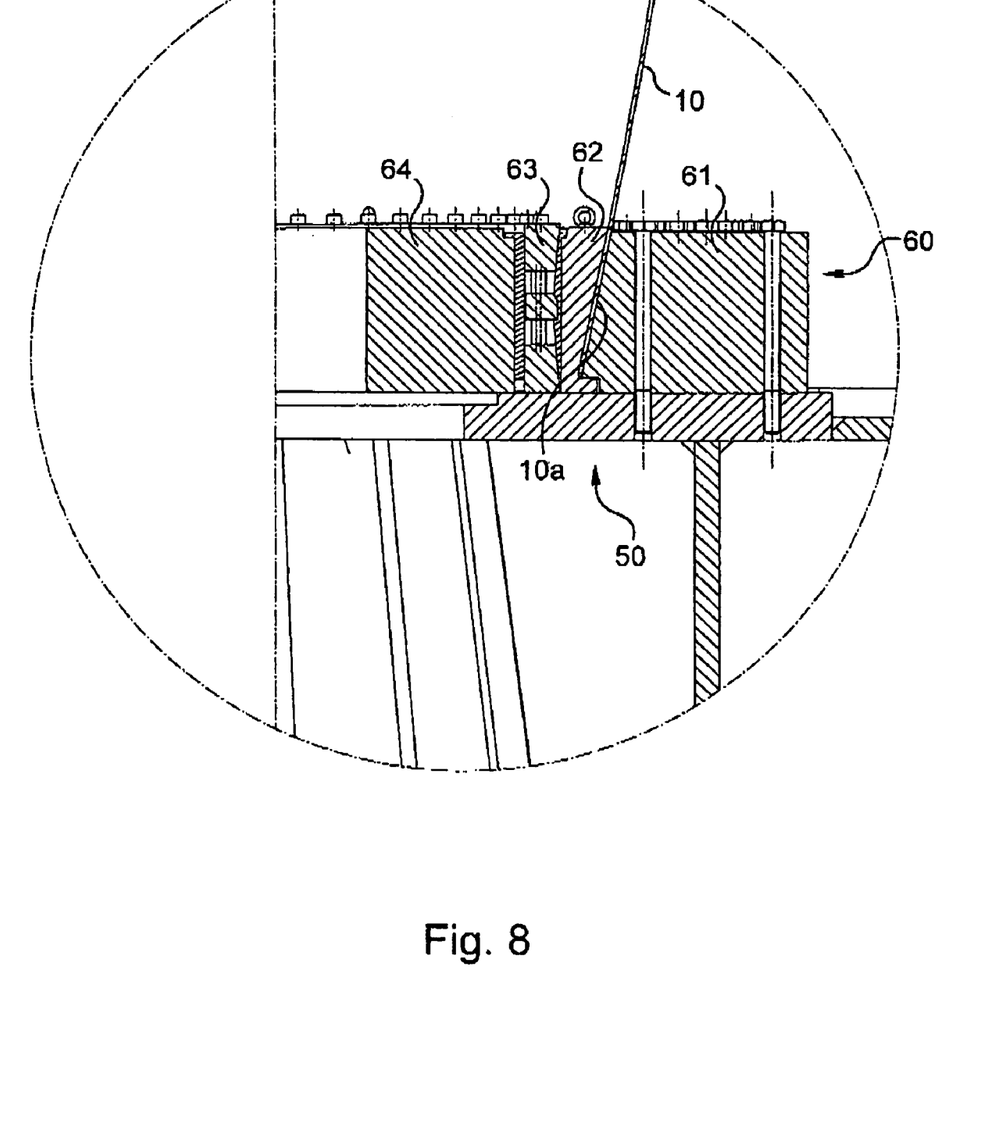
FIG. 8 is a view in partial section of means for fixing the fuselage structure to the support means of FIG. 6.

As clearly illustrated in FIG. 8, lower end 10a of fuselage structure 10 is placed between outer ring 61 and contour ring 62. Fuselage structure 10 is held in place solely by friction. To increase the coefficient of friction between its parts, the surfaces facing contour ring 62 and outer ring 61 can be treated to increase their roughness.

Outer ring 61 is capable of absorbing the stresses applied to fuselage structure 10 by force-application means 30, 40.

In order to support the longitudinal forces, particularly of tension, outer ring 61 has a series of bores 61a through which fixation bolts can be passed. The fixation bolts are capable of being fixed in seats 52a of disk 52 of central structure 51 of support means 50.

Figure 9:
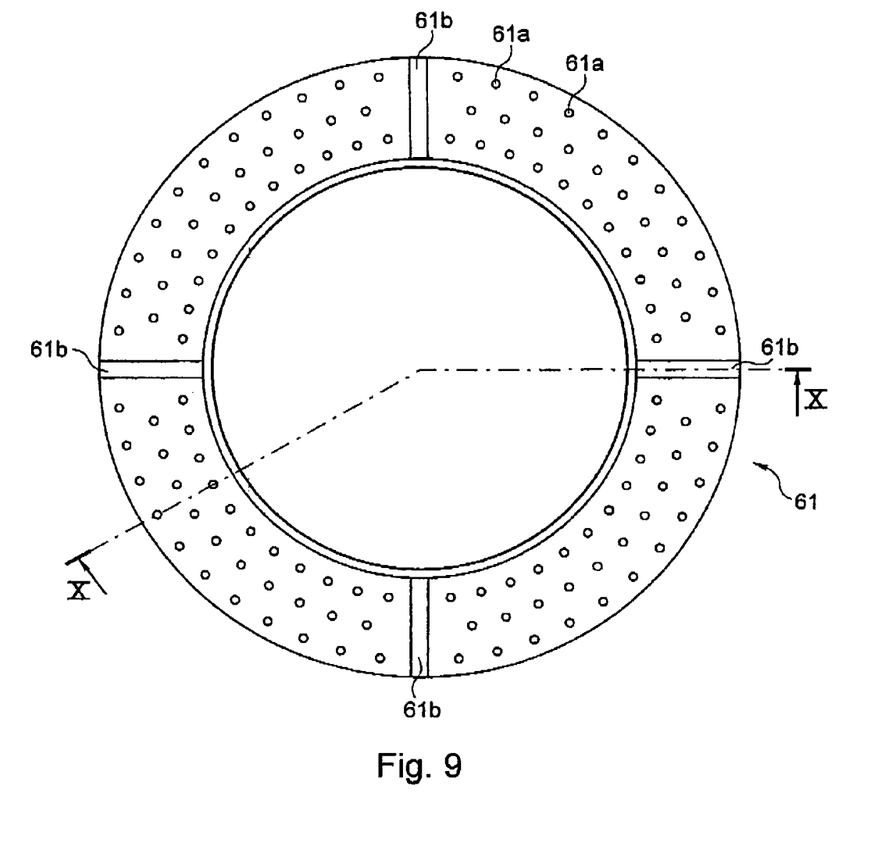
FIG. 9 is an overhead view of an element of the fixation means of FIG. 8.

Furthermore, as clearly illustrated in FIG. 9, outer ring 61 is provided with radial throats, in this case four radial throats 61b disposed 90° apart from one another.

As an example, these radial throats 61b have rectangular cross section, and their shape is complementary to that of radial ribs 52b, also provided at 90° apart from one another on disk 52 of central structure 51 of support means 51 illustrated in FIG. 6.

By virtue of this connection achieved by embedding ribs 52b in throats 61b, the torsional forces introduced into fuselage structure 10 and absorbed by outer ring 61 can be transmitted to support means 50 fixed on the floor.

Figure 10:
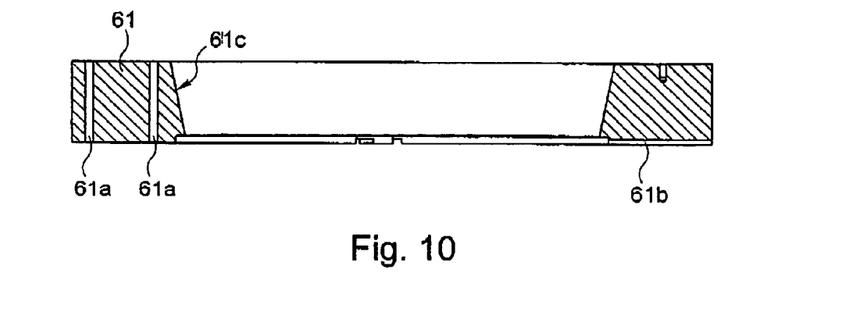
FIG. 10 is a view in cross section along line X-X of the element of FIG. 9.

As clearly illustrated in FIG. 10, outer ring 61 has overall cylindrical outer shape and overall frustoconical inner shape, its inner face 61c being capable of conforming to the outer face of lower end 10a of the fuselage structure.

Contour ring 62 is preferably constructed in several parts in order to permit assembly of this contour ring 62 with outer ring 61. In this example, contour ring 62 is formed from four sectors extending over 90°.

As clearly illustrated in FIG. 8, contour ring 62 includes a frustoconical outer face, complementary to inner face 61c of outer ring 61, in order that lower end 10a of fuselage structure 10 can be held by pinch action.

Figure 11:
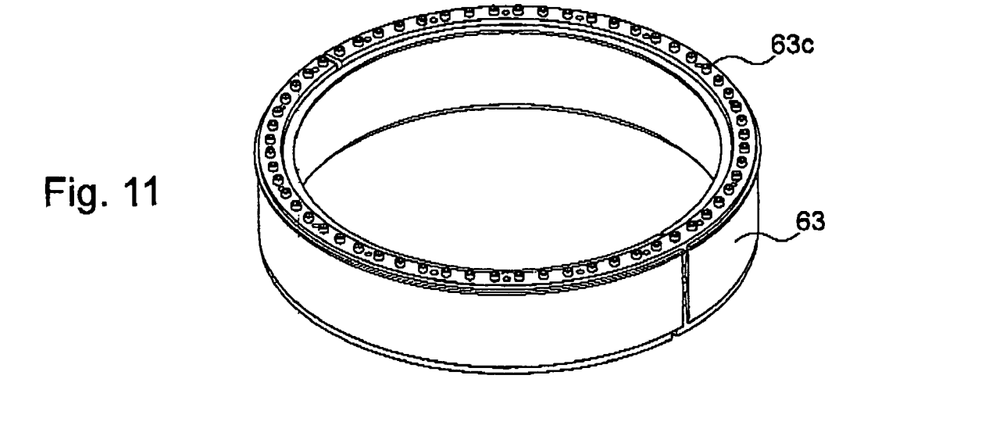
FIG. 11 is a perspective view of a second element of the fixation means of FIG. 8.
Figure 12:
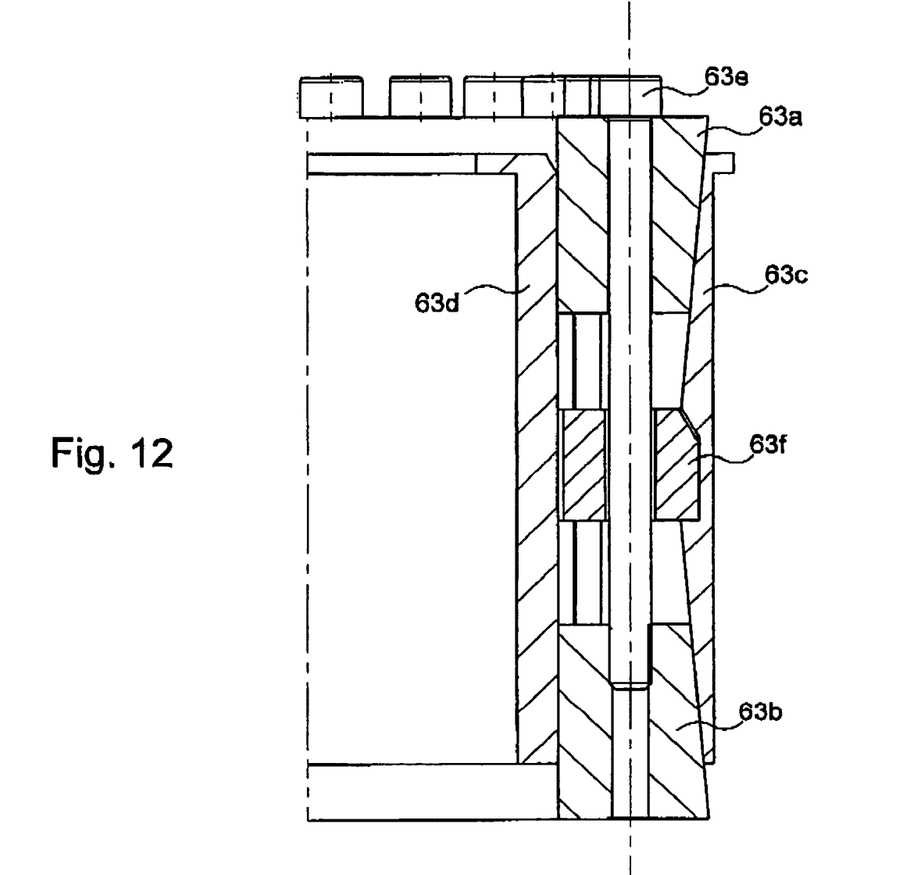
FIG. 12 is a view in partial cross section of a third element of the fixation means of FIG. 8.

In order to be able to adjust the frictional force, a pinch ring 63 such as illustrated in FIGS. 11 and 12 is mounted against contour ring 62.

Pinch ring 63 is provided with two cone-shaped rings 63a, 63b. These cone-shaped rings 63a, 63b are placed between two concentric cylindrical portions 63c, 63d, which define between them a seat for cone-shaped rings 63a, 63b.

More particularly, cone-shaped rings 63a, 63b have a cylindrical inner wall, intended to cooperate with the surface of inner cylindrical portion 63d of pinch ring 63.

Cone-shaped rings 63a, 63b additionally have frustoconical outer walls intended to come in contact with inclined inner faces of outer cylindrical portion 63c of pinch ring 63.

The two cone-shaped rings 63a, 63b are placed in upside-down relationship such that each frustoconical face forms an angle of approximately plus 5° or minus 5° respectively relative to the vertical axis.

Over the entire periphery of pinch ring 63 there is provided a series of tensioning bolts 63e intended to pass into bores provided for this purpose in cone-shaped rings 63a, 63b.

In addition, a circular guide piece 63f interlocked with concentric cylindrical portions 63c, 63d makes it possible to ensure vertical guidance of each tensioning bolt 63e.

During operation, tensioning bolts 63e are displaced along a vertical axis to move cone-shaped rings 63a, 63b further apart or closer together in such a way that the force exerted by outer frustoconical portion 63c of pinch ring 63 against contour ring 62 can be adjusted.

In this way it is possible to adjust the clamping force exerted by fixation means 60 on fuselage structure 10.

Finally, as illustrated in FIG. 8, an inner ring 64 is mounted inside pinch ring 63. It makes it possible to absorb all the radial forces generated toward the interior of fixation means 60 by pinch ring 63.

Figure 13:
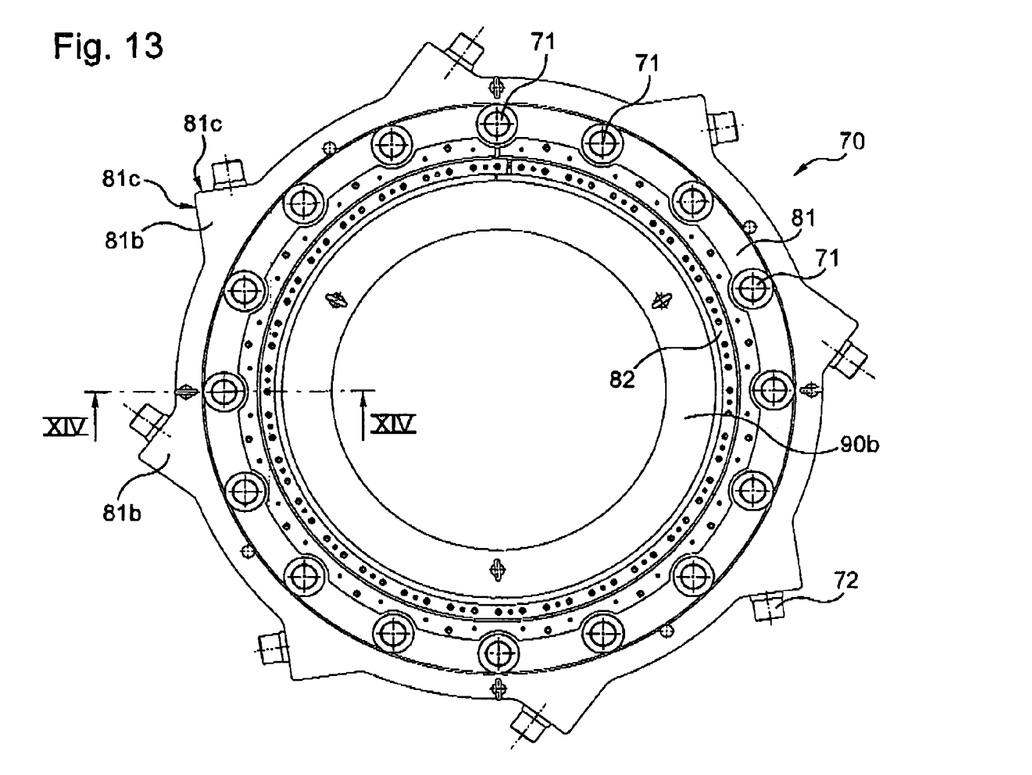
FIG. 13 is an overhead view of the force-introduction means of the apparatus of FIG. 2.
Figure 14:
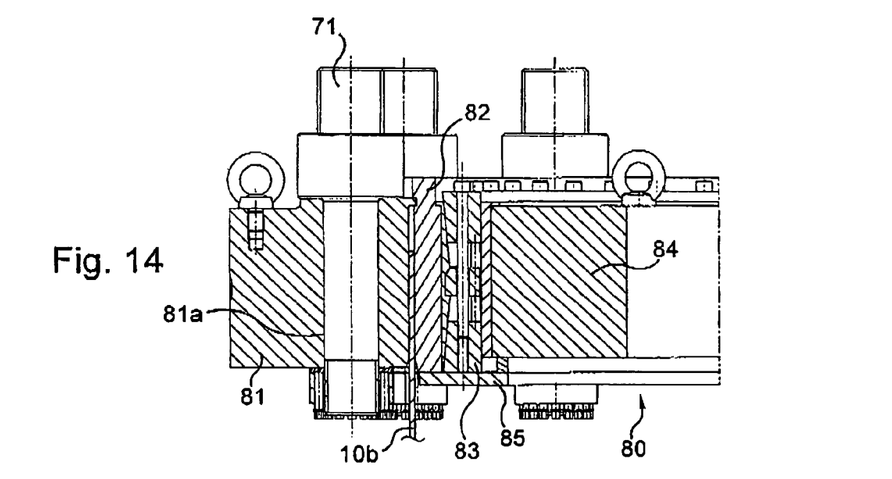
FIG. 14 is a view in partial cross section along line XIV-XIV of FIG. 13.

Referring now to FIGS. 13 and 14, there will be described force-introduction means 70. In principle, these force-introduction means 70 are formed from a substantially circular structure capable of being fixed to fuselage structure 10 along a circumferential line thereof.

As clearly illustrated in FIG. 3, force-introduction means 70 are preferably fixed to upper end 10b of fuselage structure 10. Thus the application of forces is achieved on a part of larger cross section of fuselage structure 10 in such a way that the variations at the local point of application of forces has only little impact on the behavior of fuselage structure 10 in its entirety.

As clearly illustrated in FIG. 14, force-introduction means 70 include means 80 for fixation by pinch action that are capable of interlocking, in tension and in torsion, force-introduction means 70 and upper end 10b of fuselage structure 10.

Just as for fixation means 60 of the lower end 10a of fuselage structure 10, fixation means 80 of upper end 10b are provided with an outer ring 81, a contour ring 82, a pinch ring 83 and an inner ring 84.

The fixation of upper end 10b by pinch action is identical to that described hereinabove with reference to FIG. 11 and does not need to be described again here.

However, in contrast to fixation means 60 of lower end 10a, fixation means 80 are not fixed to support means 50.

Consequently, a support ring 85, which is interlocked with contour ring 82, for example, is intended to support pinch ring 83 and inner ring 84.

Furthermore, fixation means 80 are provided with robust fixation elements to ensure fixation on the one hand of fixation elements 35 of each means 30 for application of longitudinal forces and on the other hand of auxiliary lever arm 46, by means of spherical plain bearing 46b of the means for applying torsional forces.

In particular, outer ring 81 is provided with threaded holes 81a, in which there are screwed high-strength bolts 71. These bolts are capable of being fixed to fixation element 35.

As clearly illustrated in FIG. 13, outer ring 81 is provided with sixteen bolts 71 intended to receive sixteen respective fixation elements 35 of means 30 for application of longitudinal forces.

For application of torsional forces, end 48b of auxiliary lever arm 46 is fixed by a spherical plain bearing at the location of nuts 72 disposed on the periphery of outer ring 81.

As clearly illustrated in FIG. 13, outer ring 81 is provided with eight fixation bearings 81b disposed uniformly on the periphery.

These fixation bearings 81b are therefore disposed 45° apart from one another on the periphery of outer ring 81. Each bearing 81b is in this case a triangular tooth 81b, each vertical face 81c forming an angle of 45° with a radius of means 70 for introduction of forces passing through the apex of tooth 81b.

Finally, the testing apparatus comprises means 90 for pressurizing the interior of fuselage structure 10.

Figure 15:
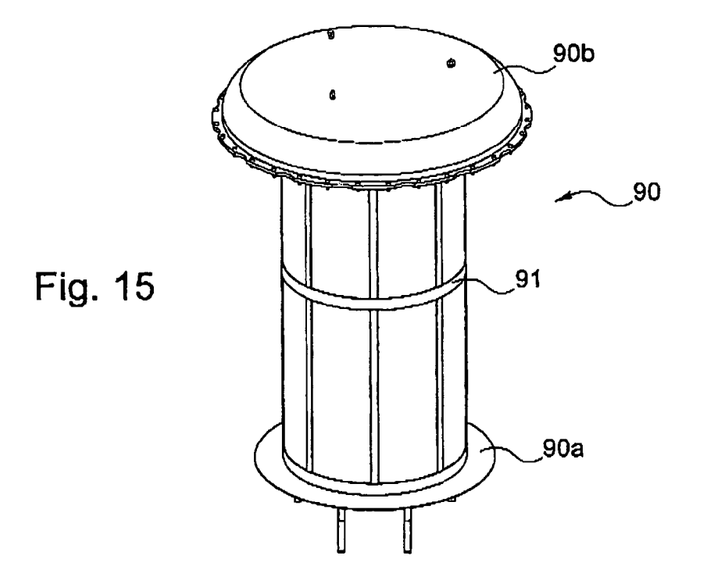
FIG. 15 is a perspective view of pressurizing means of the testing apparatus of FIG. 2.
Figure 16:
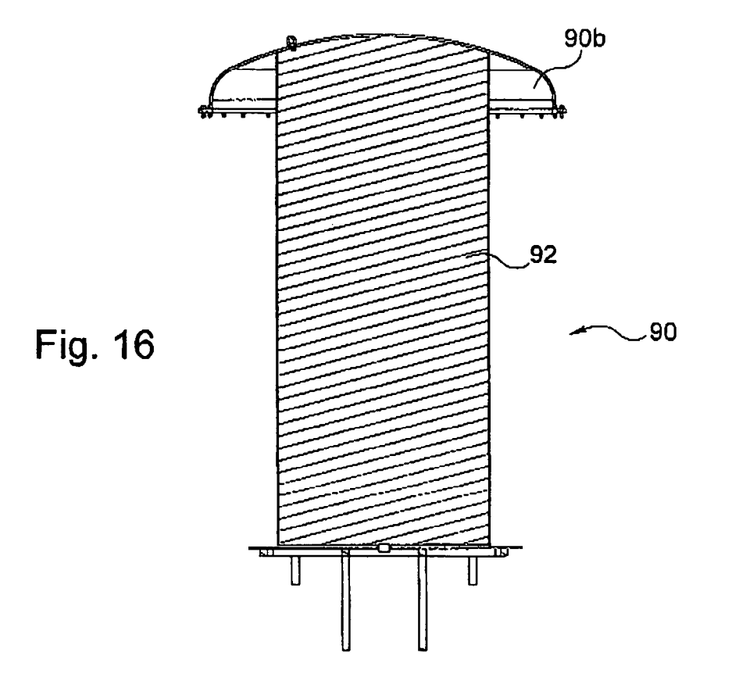
FIG. 16 is a view in longitudinal section of the pressurizing means of FIG. 15.

As clearly illustrated in FIGS. 15 and 16, pressurizing means 90 in principle comprise covers 90a, 90b fixed sealingly to lower end 10a and upper end 10b of fuselage structure 10.

In practice, a lower cover 90a is fixed sealingly to the center of support means 50. An upper cover 90b is fixed by a series of peripheral bolts to means 70 for introduction of forces, the bolts in this embodiment being disposed in corresponding bores provided in contour ring 82.

Between covers 90a, 90b, pressurizing means 90 are additionally provided with a cage-like structure 91 and vertical partitions 92, which separate the interior space from cage-like structure 91.

These vertical partitions 92 make it possible to reduce the volume to be pressurized and thus to increase the safety of the personnel in the event of a large leak or possibly of an explosion.

Cage-like structure 91 and partitions 92 are therefore capable of being expanded in the interior of the fuselage structure.

The compressed-air supply is admitted at lower cover 90a, which includes an aperture for admission of compressed air being conveyed through conduit 57, which was described hereinabove with reference to FIG. 7.

Because force-application means 30, 40 are mounted by pivot joints on the one hand and spherical plain bearing on the other hand, the mechanical stresses applied by force-application means 30, 40 are collinear with the doubly curved surface of the fuselage structure, and they remain collinear with this surface even when the fuselage structure is deformed.

By virtue of the different force-application means and of pressurizing means, it is possible to apply to the structure all the mechanical stresses representative of real behavior of the fuselage structure.

In particular, it is possible to apply the following maximum stresses:

|  | Static test | Fatigue test |
| --- | --- | --- |
| 1: Pressure + tension | $F_{max}$ = 17,000 kN | $F_{max}$ = 10,000 kN |
| 2: Pressure + compression | $\Delta P_{max}$ = 3.7 bar | $\Delta P_{max}$ = 1.9 bar |
| 3: Pressure + torsion | $M_{max}$ = 7,300 kN | $M_{max}$ = 4,300 kN |
|  | $\Delta P_{max}$ = 3.7 bar | $\Delta P_{max}$ = 1.9 bar |
| 4: Pressure + torsion + compression | $F_{max}$ = 17,000 kN | $F_{max}$ = 17,000 kN |
|  | $M_{max}$ = 7,300 kN | $M_{max}$ = 4,300 kN |
|  | $\Delta P_{max}$ = 3.7 bar | $\Delta P_{max}$ = 1.9 bar |

By virtue of the design of the apparatus such as described hereinabove, means 30 for application of longitudinal forces can be moved aside by deformation of the parallelogram formed by each jack 31, lever arm 34 and pylon 37, thus ensuring that the space outside the fuselage structure can be made available and that the said structure can be inspected from the outside.

In addition, since the fuselage structure is mounted by clamping, it is easily possible to demount the said structure and also to inspect the interior of the structure after the application of stresses.

It will be noted in addition that demounting of the structure in the course of testing can also be avoided by using methods of nondestructive inspection in traditional manner and by using sensors placed beforehand at different points of the fuselage structure.

This test structure makes it possible to study the damage tolerance as well as fatigue and static strength of a structure having double curvature. In particular, it is possible to measure the constraints applied to fuselage structure 10, recorded by strain gauges, and to observe all the deflections in the fuselage structure in all spatial directions.

It will be understood that the present invention is not limited to the practical example such as described hereinabove.

In particular, the number of hydraulic jacks used both to apply a torsional force and to apply a compressive or tensile force is in no way limitative. In addition, force-application means other than hydraulic jacks could be used.

Furthermore, other types of fixation of the fuselage structure at its ends could be used rather than those based on clamping as described hereinabove.

The invention claimed is:

1. A testing apparatus associated with a fuselage ring having a longitudinal curvature and a circumferential curvature, comprising:
   means for applying forces to said fuselage ring;
   support means for supporting said fuselage ring; and
   force-application means for applying collinear forces to said fuselage ring, wherein said force-application means are mounted between said support means and a force-introduction means, interlocked with said fuselage ring, and wherein said collinear forces are tangential at the point of application to the fuselage ring.

2. A testing apparatus according to claim 1, wherein said force-introduction means include a substantially circular structure, interlocked with said fuselage ring along a circumferential line.

3. A testing apparatus according to claim 2 wherein the fuselage ring comprises a lower end supported on the said support means and an upper end, and wherein said force-introduction means are fixed to said upper end of the fuselage ring.

4. A testing apparatus according to claim 3, wherein said upper end is an end of larger diameter of said fuselage ring.

5. A testing apparatus according to claim 3, wherein the force-introduction means comprise pinch-type fixation means for interlocking said force-introduction means and the upper end of the fuselage ring in tension and in torsion.

6. A testing apparatus according to claim 3, further comprising means for pressurizing an interior of the fuselage ring, comprising covers fixed sealingly to the lower end and upper end of said fuselage ring and means for admitting compressed air into said fuselage ring.

7. A testing apparatus according to claim 1, wherein said support means include a central platform capable of supporting the fuselage ring and the force-application means include means for applying forces of a first type and means for applying forces of a second type, and said support means further include a peripheral structure capable of supporting the means for applying forces of the second type.

8. A testing apparatus according to claim 7 wherein the means for applying forces of the first type are capable of applying a tensile or compressive force to said fuselage ring, and the means for applying forces of the second type are capable of applying a torsional force to said fuselage ring.

9. A testing apparatus according to claim 7, wherein said means for applying forces of the first type are capable of applying a collinear longitudinal force to the fuseulage ring.

10. A testing apparatus according to claim 7, wherein said means for applying forces of the first type include at least one jack capable of applying a stress along a vertical axis and mounted around a horizontal axis by a pivot joint at its ends.

11. A testing apparatus according to claim 10, wherein said jack includes an actuating end fixed to a first end of a lever arm, said first end of the lever arm being fixed to said force-introduction means, and a second end of the lever arm being fixed to a pylon mounted on said support means, said jack, lever arm and pylon being fixed to one another and to said support means by joints pivoting respectively around mutually parallel horizontal axes.

12. A testing apparatus according to claim 7, wherein the means for applying forces of the second type are capable of applying a tangential force to the curved surface of said fuselage ring.

13. A testing apparatus according to claim 12, wherein said means for applying forces of the second type include at least one jack fixed to a lever arm interlocked by a spherical plain bearing with the force-introduction means and capable of applying a tangential force to the curved surface of the fuselage ring.

14. A testing apparatus associated with a fuselage ring having a longitudinal curvature along a longitudinal axis of said fuselage ring and a circumferential curvature, comprising:
   a support mechanically coupled to a first end of said fuselage ring;
   a force-application structure mechanically coupled to a second end of said fuselage ring, said first end of the fuselage ring being opposite to said second end of said fuselage ring;
   a first plurality of jacks mechanically coupled to said support and to said force-application structure so as to apply a tensile or compressive force to said fuselage ring, wherein said jacks of said first plurality are positioned substantially parallel to said longitudinal axis of said fuselage ring and positioned outside said fuselage ring around a circumference of said fuselage ring;
   a second plurality of jacks mechanically coupled to said support and to said force-application structure so as to apply a torsenal force to said fuselage ring, wherein said jacks of said second plurality are positioned substantially parallel to said longitudinal axis of said fuselage ring and positioned outside said fuselage ring around a circumference of said fuselage ring.

15. A testing apparatus according to claim 14, wherein each jack of said first plurality of jacks is mechanically coupled to said force-application structure via a first eye joint link and to said support via a second eye joint link such that a direction of operation of each jack follows a longitudinal deformation of the fuselage ring and that a force exerted by each jack of said first plurality remains collinear with said fuselage ring and tangential to its point of application on a longitudinally curved surface of the fuselage ring.

16. A testing apparatus according to claim 15, wherein each jack of said second plurality of jacks is mechanically coupled to said force-application structure via a lever arm equipped with a spherical plain bearing fixed to said force-introduction structure, wherein said spherical plain bearing has three rotational degrees of freedom such that a force applied by said lever arm under action of each jack of said second plurality is tangential to a circumferentially curved surface of fuselage ring even after deformation of said fuselage ring in its longitudinal or circumferential directions.

17. A testing apparatus according to claim 15, wherein said support is mechanically coupled to said first end of said fuselage ring solely by friction.

* * * * *

UNITED STATES PATENT AND TRADEMARK OFFICE
CERTIFICATE OF CORRECTION

PATENT NO. : 7,421,906 B2 Page 1 of 1
APPLICATION NO. : 11/492818
DATED : September 9, 2008
INVENTOR(S) : Saves-Saint-Germes It is certified that error appears in the above-identified patent and that said Letters Patent is hereby corrected as shown below:

On the title page, the Terminal Disclaimer information should be deleted. Item (45) and the Notice information should read as follows:

-- (45) Date of Patent: Sep. 9, 2008

(*) Notice: Subject to any disclaimer, the term of this patent is extended or adjusted under 35 U.S.C. 154(b) by 127 days. --

Signed and Sealed this

Twenty-third Day of February, 2010

David J. Kappos
*Director of the United States Patent and Trademark Office*